US011514357B2

(12) United States Patent
Plihal

(10) Patent No.: US 11,514,357 B2
(45) Date of Patent: Nov. 29, 2022

(54) NUISANCE MINING FOR NOVEL DEFECT DISCOVERY

(71) Applicant: KLA-TENCOR CORPORATION, Milpitas, CA (US)

(72) Inventor: Martin Plihal, Pleasanton, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 846 days.

(21) Appl. No.: 16/277,617

(22) Filed: Feb. 15, 2019

(65) Prior Publication Data
US 2019/0287015 A1 Sep. 19, 2019

Related U.S. Application Data

(60) Provisional application No. 62/645,086, filed on Mar. 19, 2018.

(51) Int. Cl.
G06N 20/00 (2019.01)
G01N 21/95 (2006.01)

(52) U.S. Cl.
CPC ......... *G06N 20/00* (2019.01); *G01N 21/9501* (2013.01); *G01N 2201/126* (2013.01)

(58) Field of Classification Search
CPC ............... G06N 20/00; G01N 21/9501; G01N 2201/126
See application file for complete search history.

(56) References Cited

U.S. PATENT DOCUMENTS 6,999,614 B1 2/2006 Bakker et al.
2004/0120569 A1 6/2004 Hung et al.
2007/0133860 A1 6/2007 Lin et al.
2010/0119144 A1* 5/2010 Kulkarni ................. G06F 30/30
382/149
2014/0212022 A1 7/2014 Geshel et al.
2015/0254832 A1* 9/2015 Plihal ..................... G06N 20/00
382/149

(Continued)

FOREIGN PATENT DOCUMENTS

TW 201346593 A 11/2013
TW 201734439 A 10/2017

OTHER PUBLICATIONS

NIF How Lasers work, 2017.*

(Continued)

*Primary Examiner* — Alexander Satanovsky
*Assistant Examiner* — Lynda Dinh
(74) *Attorney, Agent, or Firm* — Hodgson Russ LLP

(57) ABSTRACT

A method of defect discovery can include providing a nuisance bin in a nuisance filter, partitioning the defect population into a defect population partition, segmenting the defect population partition into a defect population segment, selecting from the defect population segment a selected set of defects, computing one or more statistics of the signal attributes of the defects in the defect population segment, replicating the selected set of defects to yield generated defects, shifting the generated defects outside of the defect population segment, creating a training set, and training a binary classifier. This method can be operated on a system. The method can enable a semiconductor manufacturer to determine more accurately the presence of defects that would otherwise have gone unnoticed.

20 Claims, 7 Drawing Sheets

(56) References Cited

U.S. PATENT DOCUMENTS

| | | | |
|---|---|---|---|
| 2015/0262038 A1* | 9/2015 | Konuru | G06K 9/6282 |
| | | | 382/149 |
| 2016/0110857 A1* | 4/2016 | Plihal | G06T 7/0004 |
| | | | 382/149 |
| 2016/0258879 A1* | 9/2016 | Liang | G01N 21/8806 |
| 2016/0328837 A1 | 11/2016 | He et al. | |
| 2017/0076911 A1* | 3/2017 | Chen | G03F 7/7065 |
| 2017/0082555 A1* | 3/2017 | He | G01N 21/8851 |
| 2017/0212168 A1 | 7/2017 | Leu | |
| 2017/0309008 A1* | 10/2017 | Shi | G03F 1/84 |
| 2018/0060702 A1 | 3/2018 | Ma et al. | |

OTHER PUBLICATIONS

WIPO, ISR for PCT/US2019/022656, dated Jul. 3, 2019.
TIPO, Office Action for TW Application No. 108109196, dated Sep. 28, 2022 (see x/y/a designations on p. 3).

* cited by examiner

NUISANCE MINING FOR NOVEL DEFECT DISCOVERY

CROSS REFERENCE TO RELATED APPLICATIONS

This application claims priority to U.S. Provisional Application No. 62/645,086, filed on Mar. 19, 2018, the entire disclosure of which is hereby incorporated by reference.

FIELD OF THE DISCLOSURE

The disclosure generally relates to wafer inspection. More particularly the disclosure generally relates to nuisance filtering and defect discovery.

BACKGROUND OF THE DISCLOSURE

A difficulty in configuring nuisance filters for optical inspections of semiconductor wafers is the risk of missing defects not present during setup on the training wafer(s). This risk is particularly serious for filters based on machine-learning algorithms (ML-based algorithms), which are data driven.

With manually constructed nuisance filters, such as iDO decision trees, one can leverage domain knowledge and experience to "reserve a signal space" in the attribute space for defects that are not present on the training wafer. This approach of reserving space is used successfully for creating reliable nuisance filters that are capable of capturing "new" defects and to guarantee that any "obvious" defect is not dropped during broadband plasma (BBP) inspections.

Methodology based on manually constructed nuisance filters leverages domain knowledge and experience of human experts to allocate space in the attribute space for anticipated defects.

Manually constructed nuisance filters have disadvantages including, inter alia, requiring a manual and tedious process, they are subjective and incomplete, and they underperform ML-based filters when the training set is sufficient.

With respect to ML-based nuisance filters, the methods available for reducing this risk of missing defects include training set accumulation or training set augmentation. FIG. 1 depicts an example of a ML-based nuisance filter 100, which is a final model on a first training wafer. ML-based nuisance filter 100 begins with an intelligent classification engine (ICE) node 101. Defects are sorted based on, for example ICE class code 1 into a bin 102 and ICE class code 99 into a bin 103. Bin 103 is then sorted by confidence into the tuned bin 104 (or bins) and a bin 105 that removes defects from inspection. There is a risk in that defects-of-interest (DOIs) not yet discovered are placed into bin 105. The defects in bin 104 may be used to collect additional training data using active learning or diversity sampling. The bin 105 yields the potential to miss novel DOIs.

Training set accumulation includes setting up a secondary threshold for catching defects that cannot be retained at reasonable nuisance rate, running hotter inspections, sampling from the hotter inspections and accumulating more training sets including defects that cannot be retained, improving the nuisance filter with the accumulated training sets, and continuing until the nuisance filter matures. This approach is disadvantageous for at least the reason that it is not reliable. The nuisance filter created on the training wafer begins with the risk of missing defects of particular types on all subsequent wafers. If the defects are removed, they cannot be sampled and added to the training set even if they exist on subsequent wafers. Thus, such methods can be flawed from the outset.

Training set augmentation involves augmenting the training set to improve the maturity of the nuisance filter. This approach is disadvantageous for at least the reason that it does not work for unknown data because it is extremely difficult to augment the training set with unknown defects and to do it in a way that does not affect the performance of the classifier in a negative way.

The drawback of the ML-based nuisance filter is that the sequence of two filters is applied to the "discarded population". This population dominates the data volumes on optical inspectors, which leads to throughput risks.

Thus, improved methods, systems, and apparatuses for discovering new defects are needed.

SUMMARY OF THE DISCLOSURE

The present disclosure may be embodied as a method for novel defect discovery. The method may comprise providing a nuisance bin in a nuisance filter, partitioning the defect population into a defect population partition, segmenting the defect population partition into a defect population segment, selecting from the defect population segment a selected set of defects, computing one or more statistics of the signal attributes of the defects in the defect population segment, replicating the selected set of defects to yield generated defects, shifting the generated defects outside of the defect population segment, creating a training set, and training a binary classifier.

The present disclosure may be embodied as a system for discovering novel defects. The system may comprise an inspection tool, an electronic storage data unit, and a processor. The inspection tool may comprise a particle emitter, a stage, and a detector. The particle emitter may be configured to emit particles in a particle beam. The particles may be photons. The stage may be configured to hold a wafer. The wafer may be held by the stage in a path of the particle beam emitted by the particle emitter. The detector may be configured to detect a portion of the particles reflected by the wafer, and may further yield a die image. The electronic data storage unit may be configured to store a recipe. The recipe may include a partition rule.

The processor may be in electronic communication with the inspection tool and/or the electronic data storage unit. The processor may be configured to, for a training wafer: provide a nuisance bin in a nuisance filter, partition the defect population into a defect population partition, segment the defect population partition into a defect population segment, select from the defect population segment a selected set of defects, compute one or more statistics of the signal attributes of the defects in the defect population segment, replicate the selected set of defects to yield generated defects, shift the generated defects outside of the defect population segment, create a training set, and train a binary classifier.

The present disclosure may be embodied as a non-transitory computer-readable storage medium. The non-transitory computer-readable storage medium may comprise one or more programs for executing steps on one or more computing devices. The steps may include providing a nuisance bin in a nuisance filter, partitioning the defect population into a defect population partition, segmenting the defect population partition into a defect population segment, selecting from the defect population segment a selected set of defects, computing one or more statistics of the signal attributes of the defects in the defect population segment, replicating the selected set of defects to yield generated defects, shifting the generated defects outside of the defect population segment, creating a training set, and training a binary classifier.

The nuisance bin may include a defect population. The defect population may have a plurality of defects. Each defect in the defect population may have a signal attribute. Alternatively, each defect in the defect population may have one or more signal attributes. The signal attribute may include energy, magnitude, spot likeness, or multiple die auto-thresholding (MDAT) offset.

The partitioning may be done using a partition rule. The partition rule may include one of a hot spot, a region identification, or a care area group having at least one care area. The at least one care area may be a flexible care area The segmenting may be done using a segmentation rule. The segmentation rule may include forming the defect population segments based on an optical image context using diversity sampling in an optical image context space. The segmentation rule may alternatively or also include design-based grouping or pattern grouping.

The selecting may be done using a selection rule. The selection rule may include defects-like-me, random selection, or outlier sampling in signal space. The set of defects may include at least two defects.

The shifting may be done using the one or more statistics. The one or more statistics may include a standard deviation or a mean of the signal attributes in the defect population segment The training set may be created by labeling the selected set of defects as nuisance and the generated defects as defects-of-interest.

The binary classifier may be trained using the training set. A binary classifier may be trained in each of the defect population segments. Each binary classifier may include a novel defect bin and a real nuisance bin. The novel defect bin and the real nuisance bin may share a classification boundary configured to segregate the defect segment population into the novel defect bin and the real nuisance bin. The segregation may be done based on a signal attribute strength of each defect.

The classification boundary may be automatically adjusted to minimize a quantity of real nuisance in the novel defect bin. The classification boundary may be further adjusted, in some embodiments after it is automatically adjusted, manually by a user to update the quantity of real nuisance in the novel defect bin.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein include methods, systems, and apparatuses that overcome the weaknesses of ML-based nuisance filters with respect to manually created nuisance filters. Such embodiments effectively eliminate the risk of missing defect types on subsequent wafers that are not known at the time of training of the filter, i.e., they enable the discovery of unknown defects that were not previously included in a training set. They introduce new capabilities into the training process that transform any ML-based nuisance filter solution into a superior alternative to manually created nuisance filters. They reduce manual intervention during recipe setup and enable machine-learning approaches in simplifying inspection recipe setup, rather than the significant effort traditionally required during initial nuisance filter setup to ensure no defects are missed on subsequent wafers.

Figure 1:
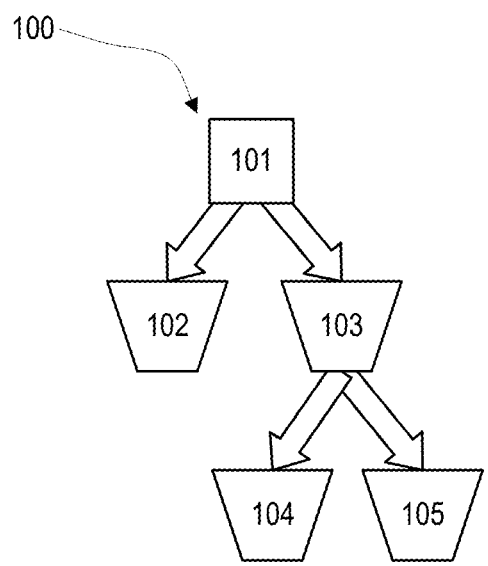
FIG. 1 illustrates an ML-based nuisance filter according to a previous method.
Figure 2:
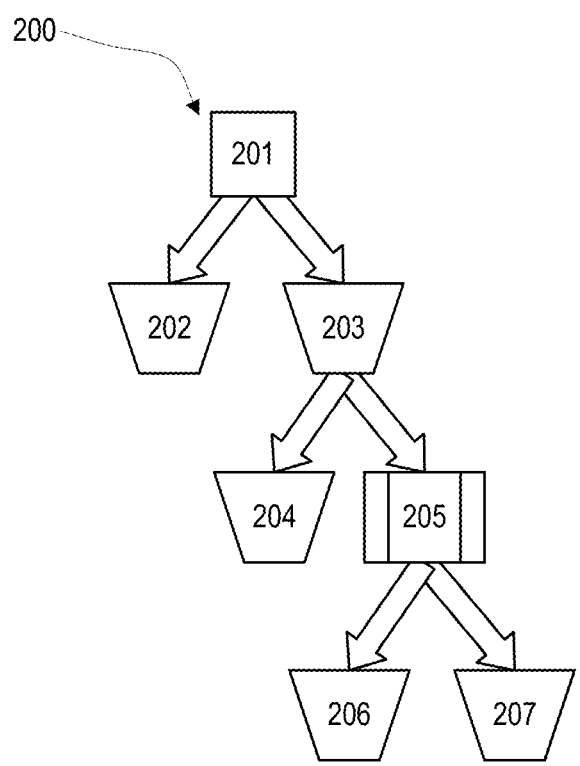
FIG. 2 illustrates a nuisance filter according to the present disclosure.

FIG. 2 depicts an embodiment of a filter 200 comprising a first stage filter and a second stage filter. The first stage filter may comprise an ICE node 201; bin 202, which may represent, for example, ICE class code 1; and bin 203, which may represent, for example, ICE class code 99. These ICE class codes are examples, and more ICE class codes during filtering are possible. An ICE may be a machine learning-based nuisance filter, and an ICE node may be such a machine learning-based nuisance filter inserted into a decision tree. Defects at ICE node 201 may be sorted into bins 202 and 203 based on their ICE class code. Bin 203 may be sorted into bin 204 and novelty node 205. Defects in bin 203 falling below a first threshold may be sorted into bin 204. Defects in bin 203 above the first threshold may be sorted into novelty node 205. The second stage filter may comprise novelty node 205, novel defect bin 206, and nuisance bin 207. Novelty node 205 may be created automatically to filter novel defects into novel defect bin 206 from nuisance bin 207.

Rather than widening the acceptability of a first stage filter, and then performing subsequent filtration on the defects that pass the first stage filter, embodiments of the second filter of the present disclosure are applied to those defects that would otherwise be rejected by the stage one filter as nuisance. Thus, if the stage one filter is properly configured with respect to the training wafer, the stage two filter captures noise and defects that were not present on the training wafer. Thresholds of greater accuracy can thus be used to map out a noise floor.

Defects and nuisance may be sorted into bin 204 and novelty node 205 based on a threshold. The threshold between them may be determined by the nuisance rate and defect cap rate requirements based on known defects.

Figure 3:
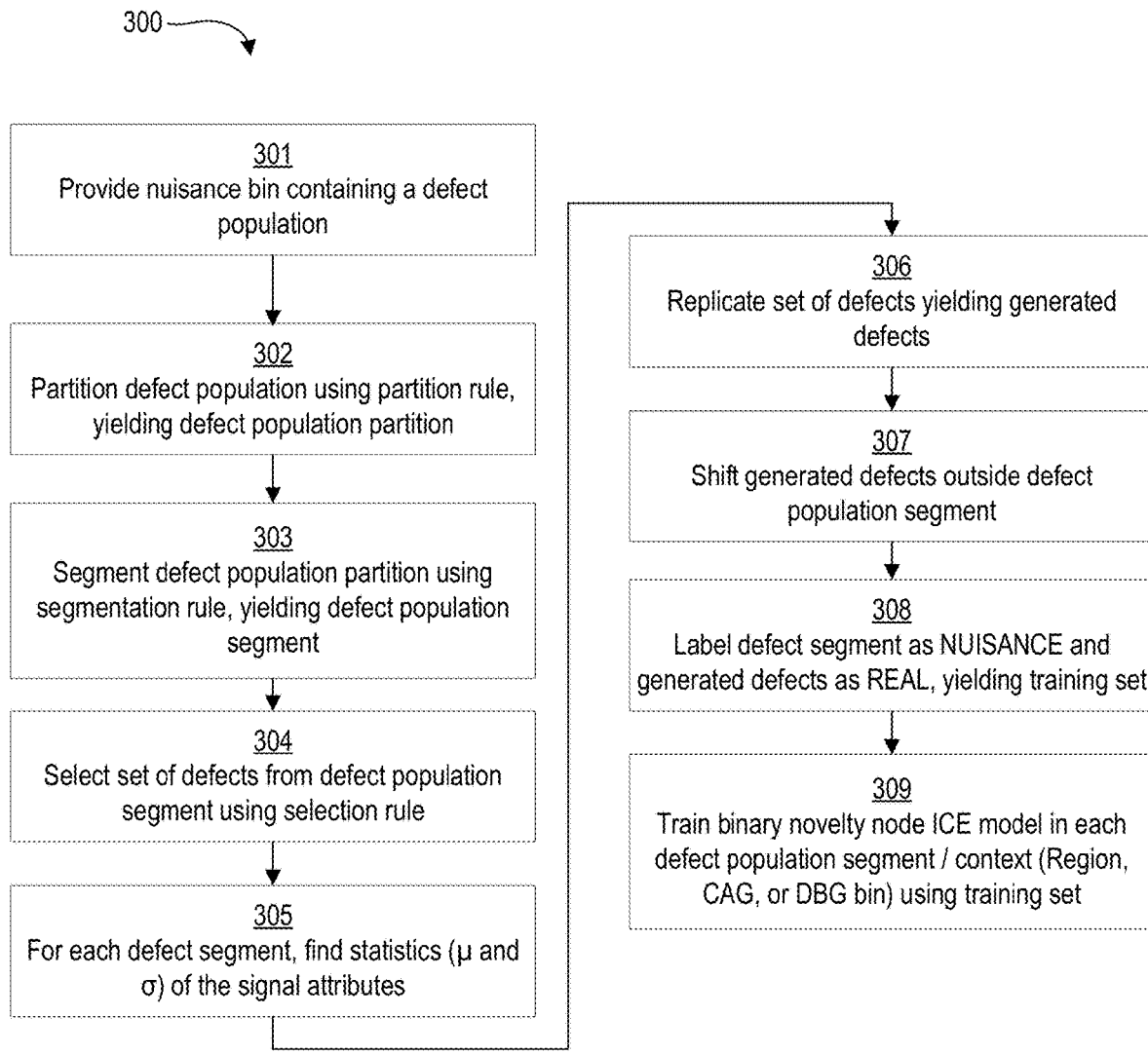
FIG. 3 illustrates a method according to embodiments of the present disclosure.

Novelty node 205 and novel defect bin 206 may be developed according to an embodiment of the present disclosure depicted in FIG. 3 as method 300. A method 300 according to the present disclosure may include providing a nuisance bin 301. Nuisance bin 301 may include a defect population, or a first plurality of defects, wherein each defect within it has at least one signal attribute. A signal attribute may be, inter alia, energy, magnitude, spot likeness, multiple die auto-thresholding (MDAT) offset. Some of the attributes may, for example, describe the maximum signal strength of the defect, and others may describe the spatial extent of the signal or its strength with respect to surrounding noise characteristics. There may be one signal attribute in the defect or a plurality of signal attributes in the defect.

Figure 4:
FIG. 4 illustrates care area groups according to embodiments of the present disclosure.
Figure 4:
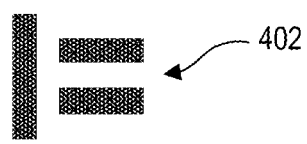

Within the novelty node 205, the defect population may be partitioned 302 based on a partition rule. The result of this partitioning 302 may include a defect population partition, or a second plurality of defects. The partition rule may include a care area groups (CAGs), hot spots, region identification, or another form of CAG code grouping. The CAG may include one or more regular care areas or flexible care areas, or any combination thereof. A care area may be a defined geometry within which inspections are performed. A flexible care area is a care area that adapts to certain changes in geometry. Alternatively, the partition rule may include Region Identification (Region ID). Examples of CAGs that could be used in partitioning 302 include CAG rules 401 or 402 depicted in FIG. 4.

Figure 5:
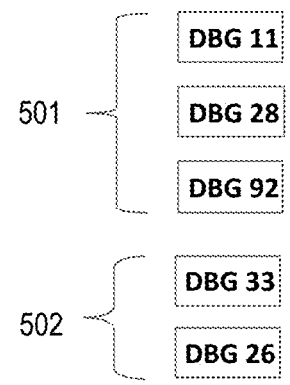
FIG. 5 illustrates design-based groups according to embodiments of the present disclosure.
Figure 6:
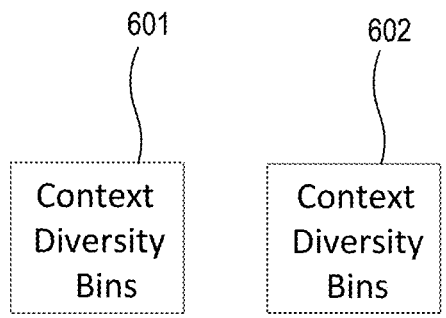
FIG. 6 illustrates context diversity bins according to embodiments of the present disclosure.

The population within each partition, i.e., the second plurality of defects, may be segmented 303 by a segmentation rule, which may be a context pattern. The result of this segmenting 303 may include a defect population segment, or third plurality of defects. The segmentation rule or context pattern could include optical patches and diversity sampling, by forming the defect population segments based on an optical image context using diversity sampling in an optical image context space, or using design and any pattern grouping method. Such a pattern grouping could be design-based grouping (DBG). A defect population partition created by, for example, CAG rules 401 and 402 may be segmented using DBG into design-based groups 501 and 502, respectively, as depicted in FIG. 5. Alternatively, a defect population partition created by, for example, CAG rules 401 and 402 may be segmented using optical patches and diversity sampling to discover context features into context diversity bins 601 and 602, respectively, as depicted in FIG. 6.

Figure 7:
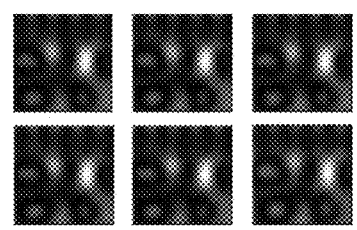
FIG. 7 illustrates selected defects according to embodiments of the present disclosure.

From the defect population segment, i.e., the third plurality of defects, a selected set of defects may be selected 304 using a selection rule. An example of a set of selected defects is depicted in FIG. 7. Note that six detected defect locations are shown in the example of FIG. 7. In embodiments where segmentation 303 is done via DBG, the selection rule used in selection 304 may be configured to select random defects within the segment. In embodiments where segmentation 303 is done via forming the defect population segments based on an optical image context space using diversity sampling in an optical image context space, the selection rule used in selection 304 may be configured to select defects of the most similar context, or a "defects-like-me" functionality. Defects-like-me functionality is a function that determines the presence of the most similar defects such as, for example, those defects most similar in the optical context around the defects.

With the defects in the defect population segment, statistics may be computed 305 of their signal attributes. One of the statistics may be a standard deviation. In some embodiments, a mean or a median is calculated also.

The defects in the defect population segment, or third plurality, may form a cluster, or cloud, of defects, with a boundary. The boundary may be in a signal space, and the measured quantity may be a signal attribute. The boundary of the defect population segment may comprise the statistical distribution of one or more signal attributes in the signal space. Measures of such statistical distribution may include the standard deviation or the mean. This statistical distribution may then be used to determine the cluster, or cloud, of the defects in the defect population segment.

The selected set of defects may be replicated 306 to form generated defects. The generated defects may be shifted 307 such that they are outside of the defect population segment, or cluster. The boundary of the defect population segment, or cluster, may be used to define a classification boundary for a novel defect bin. The shifting 307 may be performed using the statistics of the signal attributes calculated at 305. For example, a signal attribute for which the standard deviation was calculated at 305 may be shifted by a number (integer or fractional) of standard deviations to differentiate statistically the defects in the generated set from the defects in the defect population segment. This may be referred to as shifting the generated selected set of defects outside of the defect population segment, which may also be referred to as a cluster. These generated defects may define or improve the definition of the classification boundary that will be established for the novel defect bin.

Figure 8:
FIG. 8 illustrates the generation of a generated defect according to embodiments of the present disclosure.
Figure 9:
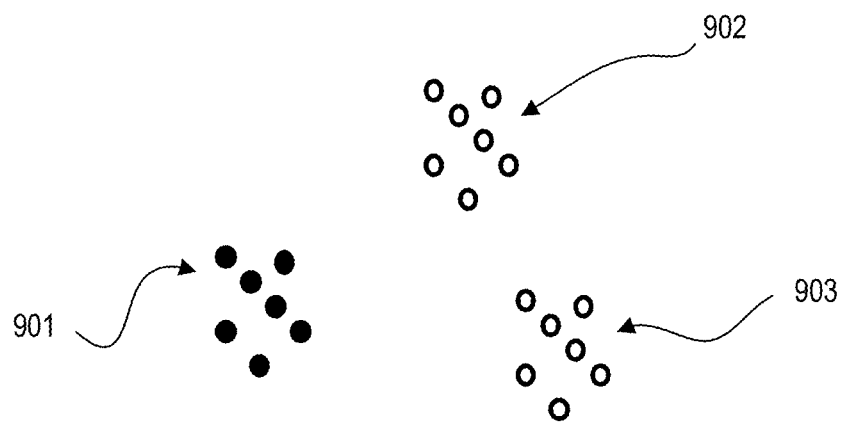
FIG. 9 illustrates the generation of sets of generated defects according to embodiments of the present disclosure.

An embodiment of this defect generation is depicted in FIG. 8. In FIG. 8, a defect 801 from a selected set of defects is replicated and shifted to yield generated defect 802. FIG. 9 depicts a plurality of defects that have undergone such a process. For instance, a selected set of defects 901 are replicated and shifted to yield generated defects 902 and 903. Generated defects 902 and 903 may be shifted, for instance, by increasing a signal attribute by a number (integer or fractional) of standard deviations for the signal attribute across the selected set of defects as described herein. Thus, replicated sets 902 and 903 comprise generated defects.

After the replication 306 and shifting 307, the selected set of defects and the generated defects may be used to create a training set at 308. The training set generation 308 may be accomplished by labeling the defects in the defect population segment segmented in 303 as NUISANCE and labeling the replicated and shifted generated defects generated at 306 and 307 REAL, or DOIs. Any other suitable labeling or designation of defects that differentiate the generated defects from the defect population segment may be used. Such defect labeling may be binary, differentiating between nuisance and DOIs in each segmented context, for instance by labeling nuisance and DOIs for each CAG code.

The training set generated in 308 may then be used at 309 to train an ICE model in a context to yield a trained ICE model. The trained intelligent classification engine may include a novel defect bin, such as novel defect bin 206, which may have a classification boundary that separates it from nuisance bin 207. In some embodiments, the ICE model may be binary. The contexts within which the trained ICE model may be trained include a region, CAG, or DBG bin.

Figure 10:
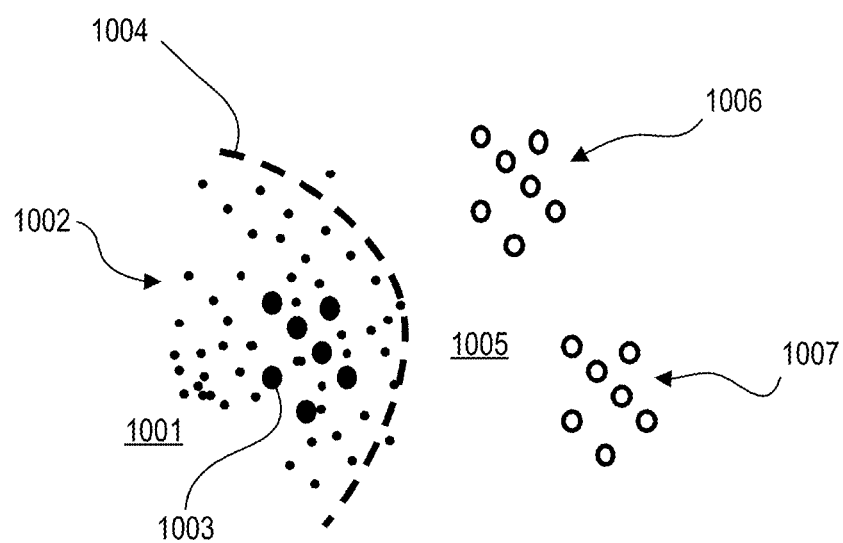
FIG. 10 illustrates a novel defect bin, a nuisance bin, and related defects according to embodiments of the present disclosure.

The training 309 may include establishing a classification boundary 1004 as depicted in FIG. 10. FIG. 10 shows a selected set of defects 1003 amidst other unselected defects within a defect population segment 1002. A nuisance bin 1001 may be established corresponding to the defect population segment 1002, with a classification boundary 1004 separating the nuisance bin 1001 from a novel defect bin 1005. Within novel defect bin 1005, there may be generated defects 1006 and 1007, which are considered novel defects. Generated defects 1006 and 1007 have been formed by replicating selected set of defects 1003 and shifting the generated defects 1006 and 1007 outside of the defect population segment 1002.

The classification boundary 1004 may be auto-tuned, or automatically adjusted, at 309 to keep zero or a small fraction of the defects in novel defect bin 1005. This may be done by tuning it to the statistical distribution of the defect population segment 1002.

Figure 11:
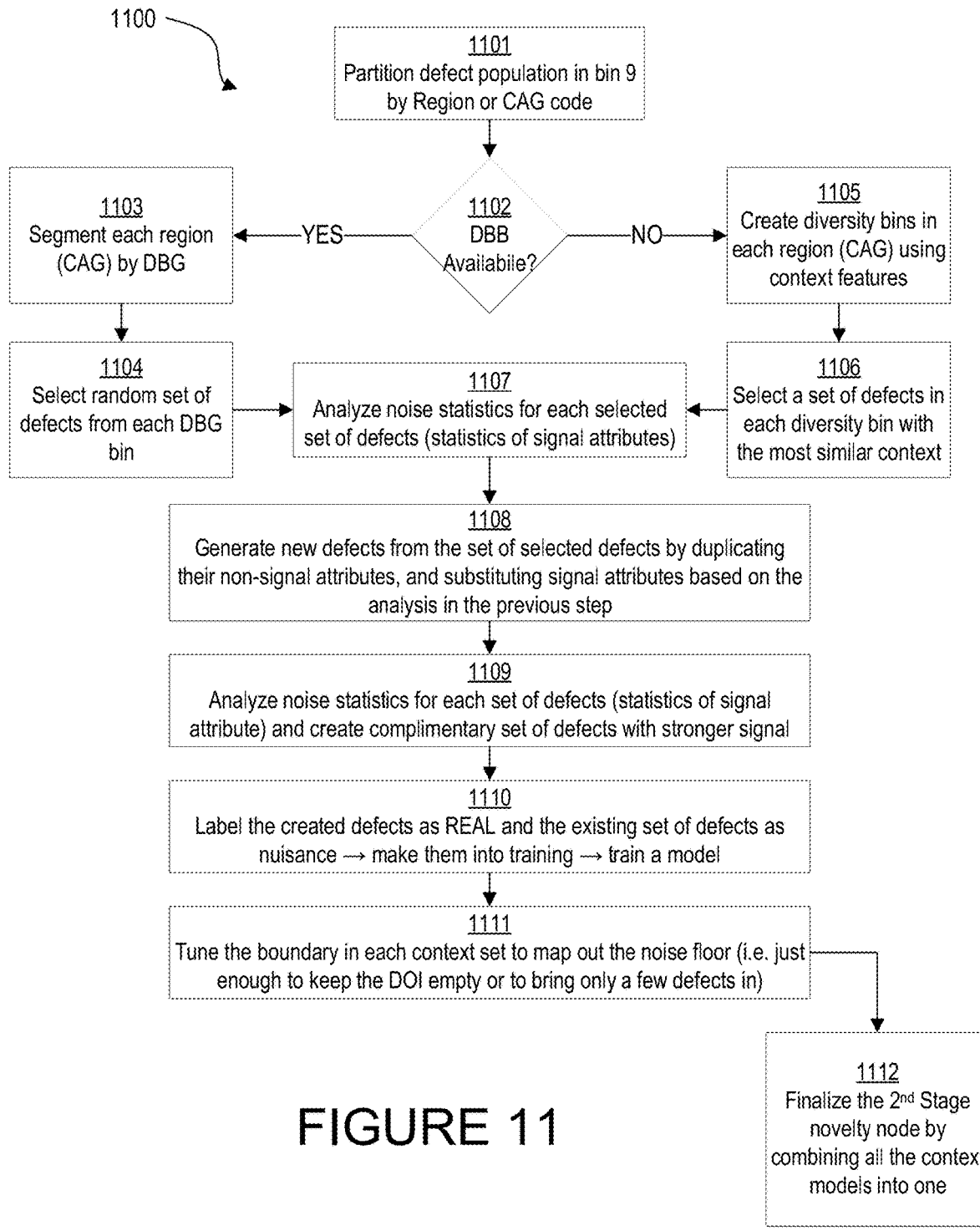
FIG. 11 illustrates a method according to embodiments of the present disclosure.

In another embodiment of the present disclosure, a method 1100 of creating a second stage novelty, or novel defect, filter is depicted in FIG. 11. Method 1100 may begin by, at 1101, by partitioning a defect population by a Region or CAG code.

The process could diverge at 1102 depending on whether design-based binning (DBB) is available.

In embodiments where DBB is available, each region or CAG may be segmented at 1103 by DBG and a random selected set of defects may be selected at 1104 from each DBG bin to yield a selected set of defects.

In embodiments where DBB is not available, each region or CAG can be used to create one or more diversity bins at 1105 in each region or CAG using context features. From each diversity bin, a selected set of defects having the most similar context can be selected at 1106, thus yielding a selected set of defects.

With each selected set of defects created at either 1104 or 1106, noise statistics may be analyzed at 1107 for each selected set of defects to determine statistics of signal attributes. New defects may then be generated at 1108 from the set of selected defects by duplicating their non-signal attributes and substituting signal attributes based on the analysis performed at 1107, yielding a generated set.

Each set's noise statistics, or statistics of signal attribute(s), may be analyzed at 1109 and a complimentary selected set of defects may be created with stronger signal.

After the new generated set is created, at 1110, the generated set is labeled as REAL, or DOIs, and the selected set of defects is labeled as NUISANCE. Additionally at 1110, the labeled defects may be used to generate a training model, which may be used to train a model having a context segment that comprises a novel defect bin with a classification boundary, such as novel defect bins 206 or 1005. The classification boundary, or boundary, within each context segment may be tuned at 1111 to map out the noise floor, for instance, automatically adjusted to be broad enough to keep a novel defect bin or DOIs bin empty or to place only a few defects within it.

The novelty node may then be finalized by combining the context models into the novelty node at 1112.

The present disclosure has several advantages over existing methodologies and systems. It provides a systematic and fully automated approach to mapping out noise floor for various contexts and regions. It provides a reliable approach to capture defects that have not been observed already and are not present in the training set, i.e. it reliably captures novelties in ML-based nuisance filters. The novelty capture is performed in a non-intrusive way, without degrading the performance of the trained nuisance filter. This method significantly reduces the risk of missing defects that have signal in the BBP inspection. It simplifies recipe setups that use ML-based nuisance filters. It makes BBP inspections less prone to missing defects. It also enables more robust novelty discovery for production lots.

The auto-tuning of the classification boundary in each context can be performed with various degrees of aggressiveness depending on use case. For instance, bins 206 or 1005 could be empty or could contain certain small number of defects. Manual adjustments of confidence cut lines can follow an automatic adjustment when desirable. The strength of the signal for generated defects should be large enough to allow 100% separation.

If the real nuisance can be tolerated in the DOI bin, the same methodology can be used. If the real nuisance is assigned to a different "real" bin, the novelty node may have to be applied to both the DOI and real bin, if the real defects appear in contexts where DOIs can show up. However, binning real nuisance with no-signal scanning electron microscopy (SEM) non-visuals (SNVs) into a nuisance bin may not work well. This is because real nuisance has a signal and thus appears as outliers in the signal space. Some of the real nuisance could be ameliorated using supervised machine learning, but not all. Such real nuisance would be inspected, which is undesirable.

Methods disclosed herein can also be applied only a select set of contexts if they are known to be candidates for missing DOIs.

Methods disclosed herein are meant to address the problems with data sufficiency until the nuisance filter "matures." However, certain embodiments can also be used for monitoring of specific, or all, contexts for new defects to enhance novelty discovery.

Since the contents of, for instance, bins 206 or 1005 are not part of the inspection used for defect monitoring; their content can be managed dynamically throughout the recipe lifetime. That is, the classification boundaries can be updated dynamically and adjusted to the process variations as new data is collected on subsequent wafer. This dynamic management over recipe lifetime would require continuous sampling from, for instance, bins 206 or 1005 on production lots.

Figure 12:
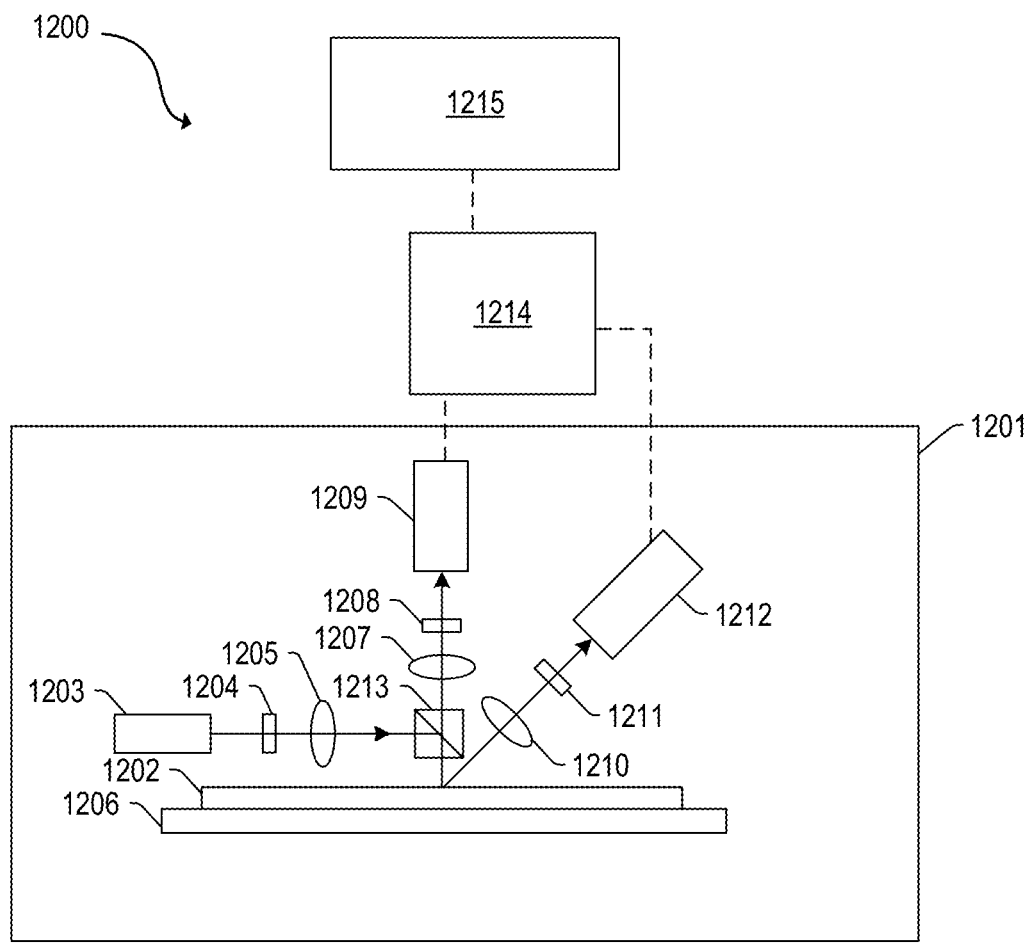
FIG. 12 illustrates a system according to embodiments of the present disclosure.

One embodiment of a system 1200 is shown in FIG. 12. The system 1200 includes optical based subsystem 1201. In general, the optical based subsystem 1201 is configured for generating optical based output for a specimen 1202 by directing light to (or scanning light over) and detecting light from the specimen 1202. In one embodiment, the specimen 1202 includes a wafer. The wafer may include any wafer known in the art. In another embodiment, the specimen includes a reticle. The reticle may include any reticle known in the art.

In the embodiment of the system 1200 shown in FIG. 12, optical based subsystem 1201 includes an illumination subsystem configured to direct light to specimen 1202. The illumination subsystem includes at least one light source. For example, as shown in FIG. 12, the illumination subsystem includes light source 1203. In one embodiment, the illumination subsystem is configured to direct the light to the specimen 1202 at one or more angles of incidence, which may include one or more oblique angles and/or one or more normal angles. For example, as shown in FIG. 12, light from light source 1203 is directed through optical element 1204 and then lens 1205 to specimen 1202 at an oblique angle of incidence. The oblique angle of incidence may include any suitable oblique angle of incidence, which may vary depending on, for instance, characteristics of the specimen 1202.

The optical based subsystem 1201 may be configured to direct the light to the specimen 1202 at different angles of incidence at different times. For example, the optical based subsystem 1201 may be configured to alter one or more characteristics of one or more elements of the illumination subsystem such that the light can be directed to the specimen 1202 at an angle of incidence that is different from that shown in FIG. 12. In one such example, the optical based subsystem 1201 may be configured to move light source 1203, optical element 1204, and lens 1205 such that the light is directed to the specimen 1202 at a different oblique angle of incidence or a normal (or near normal) angle of incidence.

In some instances, the optical based subsystem 1201 may be configured to direct light to the specimen 1202 at more than one angle of incidence at the same time. For example, the illumination subsystem may include more than one illumination channel, one of the illumination channels may include light source 1203, optical element 1204, and lens 1205 as shown in FIG. 12 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 1202 at different angles of incidence may be different such that light resulting from illumination of the specimen 1202 at the different angles of incidence can be discriminated from each other at the detector(s).

In another instance, the illumination subsystem may include only one light source (e.g., light source 1203 shown in FIG. 12) and light from the light source may be separated into different optical paths (e.g., based on wavelength, polarization, etc.) by one or more optical elements (not shown) of the illumination subsystem. Light in each of the different optical paths may then be directed to the specimen 1202. Multiple illumination channels may be configured to direct light to the specimen 1202 at the same time or at different times (e.g., when different illumination channels are used to sequentially illuminate the specimen). In another instance, the same illumination channel may be configured to direct light to the specimen 1202 with different characteristics at different times. For example, in some instances, optical element 1204 may be configured as a spectral filter and the properties of the spectral filter can be changed in a variety of different ways (e.g., by swapping out the spectral filter) such that different wavelengths of light can be directed to the specimen 1202 at different times. The illumination subsystem may have any other suitable configuration known in the art for directing the light having different or the same characteristics to the specimen 1202 at different or the same angles of incidence sequentially or simultaneously.

In one embodiment, light source 1203 may include a broadband plasma (BBP) source. In this manner, the light generated by the light source 1203 and directed to the specimen 1202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly monochromatic. In this manner, the laser may be a narrowband laser. The light source 1203 may also include a polychromatic light source that generates light at multiple discrete wavelengths or wavebands.

Light from optical element 1204 may be focused onto specimen 1202 by lens 1205. Although lens 1205 is shown in FIG. 12 as a single refractive optical element, it is to be understood that, in practice, lens 1205 may include a number of refractive and/or reflective optical elements that in combination focus the light from the optical element to the specimen. The illumination subsystem shown in FIG. 12 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 1213), aperture(s), and the like, which may include any such suitable optical elements known in the art. In addition, the optical based subsystem 1201 may be configured to alter one or more of the elements of the illumination subsystem based on the type of illumination to be used for generating the optical based output.

The optical based subsystem 1201 may also include a scanning subsystem configured to cause the light to be scanned over the specimen 1202. For example, the optical based subsystem 1201 may include stage 1206 on which specimen 1202 is disposed during optical based output generation. The scanning subsystem may include any suitable mechanical and/or robotic assembly (that includes stage 1206) that can be configured to move the specimen 1202 such that the light can be scanned over the specimen 1202. In addition, or alternatively, the optical based subsystem 1201 may be configured such that one or more optical elements of the optical based subsystem 1201 perform some scanning of the light over the specimen 1202. The light may be scanned over the specimen 1202 in any suitable fashion such as in a serpentine-like path or in a spiral path.

The optical based subsystem 1201 further includes one or more detection channels. At least one of the one or more detection channels includes a detector configured to detect light from the specimen 1202 due to illumination of the specimen 1202 by the subsystem and to generate output responsive to the detected light. For example, the optical based subsystem 1201 shown in FIG. 12 includes two detection channels, one formed by collector 1207, element 1208, and detector 1209 and another formed by collector 1210, element 1211, and detector 1212. As shown in FIG. 12, the two detection channels are configured to collect and detect light at different angles of collection. In some instances, both detection channels are configured to detect scattered light, and the detection channels are configured to detect tight that is scattered at different angles from the specimen 1202. However, one or more of the detection channels may be configured to detect another type of light from the specimen 1202 (e.g., reflected light).

As further shown in FIG. 12, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 1210, element 1211, and detector 1212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 12 shows an embodiment of the optical based subsystem 1201 that includes two detection channels, the optical based subsystem 1201 may include a different number of detection channels (e.g., only one detection channel or two or more detection channels). In one such instance, the detection channel formed by collector 1210, element 1211, and detector 1212 may form one side channel as described above, and the optical based subsystem 1201 may include an additional detection channel (not shown) formed as another side channel that is positioned on the opposite side of the plane of incidence. Therefore, the optical based subsystem 1201 may include the detection channel that includes collector 1207, element 1208, and detector 1209 and that is centered in the plane of incidence and configured to collect and detect light at scattering angle(s) that are at or close to normal to the specimen 1202 surface. This detection channel may therefore be commonly referred to as a "top" channel, and the optical based subsystem 1201 may also include two or more side channels configured as described above. As such, the optical based subsystem 1201 may include at least three channels (i.e., one top channel and two side channels), and each of the at least three channels has its own collector, each of which is configured to collect light at different scattering angles than each of the other collectors.

As described further above, each of the detection channels included in the optical based subsystem 1201 may be configured to detect scattered light. Therefore, the optical based subsystem 1201 shown in FIG. 12 may be configured for dark field (DF) output generation for specimens 1202. However, the optical based subsystem 1201 may also or alternatively include detection channel(s) that are configured for bright field (BF) output generation for specimens 1202. In other words, the optical based subsystem 1201 may include at least one detection channel that is configured to detect light specularly reflected from the specimen 1202. Therefore, the optical based subsystems 1201 described herein may be configured for only DF, only BF, or both DF and BF imaging. Although each of the collectors is shown in FIG. 12 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 1214 may be configured to generate images of the specimen 1202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 12 is provided herein to generally illustrate a configuration of an optical based subsystem 1201 that may be included in the system embodiments described herein or that may generate optical based output that is used by the system embodiments described herein. The optical based subsystem 1201 configuration described herein may be altered to optimize the performance of the optical based subsystem 1201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 1214 may be coupled to the components of the system 1200 in any suitable manner (e.g., via one or more transmission media, which may include wired and/or wireless transmission media) such that the processor 1214 can receive output. The processor 1214 may be configured to perform a number of functions using the output. The system 1200 can receive instructions or other information from the processor 1214. The processor 1214 and/or the electronic data storage unit 1215 optionally may be in electronic communication with a wafer inspection tool, a wafer metrology tool, or a wafer review tool (not illustrated) to receive additional information or send instructions. For example, the processor 1214 and/or the electronic data storage unit 1215 can be in electronic communication with an SEM.

The processor 1214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 1214 and electronic data storage unit 1215 may be disposed in or otherwise part of the system 1200 or another device. In an example, the processor 1214 and electronic data storage unit 1215 may be part of a standalone control unit or in a centralized quality control unit. Multiple processors 1214 or electronic data storage units 1215 may be used.

The processor 1214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 1214 to implement various methods and functions may be stored in readable storage media, such as a memory in the electronic data storage unit 1215 or other memory.

If the system 1200 includes more than one processor 1214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 1214 may be configured to perform a number of functions using the output of the system 1200 or other output. For instance, the processor 1214 may be configured to send the output to an electronic data storage unit 1215 or another storage medium. The processor 1214 may be further configured as described herein.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 1214 may be configured according to any of the embodiments described herein. The processor 1214 also may be configured to perform other functions or additional steps using the output of the system 1200 or using images or data from other sources.

Various steps, functions, and/or operations of system 1200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 1214 or, alternatively, multiple processors 1214. Moreover, different subsystems of the system 1200 may include one or more computing or logic systems. Therefore, the above description should not be interpreted as a limitation on the present disclosure but merely an illustration.

In an instance, the processor 1214 is in communication with the system 1200. The processor 1214 may be configured to, for a training wafer: provide a nuisance bin in a nuisance filter, partition the defect population into a defect population partition, segment the defect population partition into a defect population segment, select from the defect population segment a selected set of defects, compute one or more statistics of the signal attributes of the defects in the defect population segment, replicate the selected set of defects to yield generated defects, shift the generated defects outside of the defect population segment, create a training set, and train a binary classifier.

As performed on processor 1214, the nuisance bin may include a defect population. The defect population may have a plurality of defects. Each defect in the defect population may have a signal attribute. Alternatively, each defect in the defect population may have one or more signal attributes. The signal attribute may include energy, magnitude, spot likeness, or multiple die auto-thresholding (MDAT) offset.

Processor 1214 may perform the partitioning using a partition rule. The partition rule may include one of a hot spot, a region identification, or a care area group having at least one care area. The at least one care area may be a flexible care area Processor 1214 may perform the segmenting using a segmentation rule. The segmentation rule may include forming the defect population segments based on an optical image context using diversity sampling in an optical image context space. The segmentation rule may alternatively or also include design-based grouping or pattern grouping.

Processor 1214 may perform the selecting using a selection rule. The selection rule may include defects-like-me, random selection, or outlier sampling in signal space. The set of defects may include at least two defects.

Processor 1214 may perform the shifting using the one or more statistics. The one or more statistics may include a standard deviation or a mean of the signal attributes in the defect population segment Processor 1214 may create the training set by labeling the selected set of defects as nuisance and the generated defects as defects-of-interest.

Processor 1214 may train the binary classifier using the training set. A binary classifier may be trained in each of the defect population segments. Each binary classifier may include a novel defect bin and a real nuisance bin. The novel defect bin and the real nuisance bin may share a classification boundary configured to segregate the defect segment population into the novel defect bin and the real nuisance bin. The segregation may be done based on a signal attribute strength of each defect.

Processor 1214 may automatically adjust the classification boundary to minimize a quantity of real nuisance in the novel defect bin. The classification boundary may be further adjusted, in some embodiments after it is automatically adjusted, manually by a user to update the quantity of real nuisance in the novel defect bin.

An additional embodiment relates to a non-transitory computer-readable medium storing program instructions executable on a controller for performing a computer-implemented method for determining a height of an illuminated region on a surface of a specimen 1202, as disclosed herein. In particular, as shown in FIG. 12, electronic data storage unit 1215 or other storage medium may contain non-transitory computer-readable medium that includes program instructions executable on the processor 1214. The computer-implemented method may include any step(s) of any method(s) described herein, including methods 300 and 1100.

Program instructions implementing methods such as those described herein may be stored on computer-readable medium, such as in the electronic data storage unit 1215 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

In operation, once a first stage nuisance filter is tuned, the creation of the second stage nuisance filter initiated. An operator can initiate this creation by creating a catch-all novel defect bin. The creation of the bin may occur according to method 300 or 1100. The sensitivity of the catch-all novel defect bin may be automatically tuned to a noise floor. The catch-all novel defect bin may be empty on the training wafer.

Previous methods and systems for defect discovery were slow, required manual input and guesswork, and often missed defects that are otherwise desirable to capture. The present disclosure presents methods, systems, and apparatuses that improve defect discovery functionality by determining the presence of defects that would otherwise have been missed.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

Although the present disclosure has been described with respect to one or more particular embodiments, it will be understood that other embodiments of the present disclosure may be made without departing from the scope of the present disclosure.

What is claimed is:

1. A method of defect discovery, comprising:
   providing a nuisance bin in a nuisance filter, the nuisance bin including a defect population having a plurality of defects, wherein each defect has a signal attribute;
   partitioning the defect population, using a partition rule, into a defect population partition, wherein the partition rule uses a care area group;
   segmenting the defect population partition, using a segmentation rule, into a defect population segment, wherein the segmentation rule uses a context pattern;
   selecting, using a selection rule, from the defect population segment, a selected set of defects including at least two defects;
   computing one or more statistics of the signal attributes of the defects in the defect population segment;
   replicating the selected set of defects to yield generated defects;
   shifting, using the one or more statistics, the generated defects outside of the defect population segment by increasing the signal attributes by a number of standard deviations;
   creating a training set with the selected set of defects and the generated defects, wherein the selected set of defects is labeled as nuisance in the training set and the generated defects are labeled as defects-of-interest in the training set; and
   training, using the training set, a binary classifier for each of the defect population segments, wherein the binary classifier includes a novel defect bin and a real nuisance bin, wherein the novel defect bin and real nuisance bin share a classification boundary, and wherein the classification boundary is configured to segregate the defect segment population into the novel defect bin and the real nuisance bin based on a signal attribute strength of each defect.

2. The method of claim 1, wherein the one or more statistics include a standard deviation or a mean of the signal attributes of the defects in the defect population segment.

3. The method of claim 1, wherein the signal attribute includes energy, magnitude, spot likeness, or multiple die auto-thresholding offset.

4. The method of claim 1, wherein the partition rule includes one of a hot spot, a region identification, or at least one care area.

5. The method of claim 4, wherein the at least one care area is a flexible care area.

6. The method of claim 1, wherein the segmentation rule includes forming the defect population segments based on an optical image context using diversity sampling in an optical image context space.

7. The method of claim 1, wherein the segmentation rule includes design-based grouping or pattern grouping.

8. The method of claim 1, wherein the selection rule includes defects-like-me, random selection, or outlier sampling in signal space.

9. The method of claim 1, wherein the classification boundary is automatically adjusted to minimize a quantity of real nuisance in the novel defect bin.

10. The method of claim 9, wherein after the classification boundary is automatically adjusted, the classification boundary is manually adjusted by a user to update the quantity of real nuisance in the novel defect bin.

11. A system for discovering defects, comprising:
    an inspection tool comprising:
       a particle emitter configured to emit particles in a particle beam,
       a stage configured to hold a training wafer in a path of the particle beam emitted by the particle emitter, and
       a detector configured to detect a portion of the particles reflected by the training wafer and yield a die image;
    an electronic data storage unit configured to store a recipe, the recipe including a partition rule; and
    a processor in electronic communication with the inspection tool and the electronic data storage unit configured to, for the training wafer:
       provide a nuisance bin in a nuisance filter, the nuisance bin including a defect population having a plurality of defects from the training wafer, wherein each defect has a signal attribute;
       partition the defect population, using the partition rule, into a defect population partition, wherein the partition rule uses a care area group;
       segment the defect population partition, using a segmentation rule, into a defect population segment, wherein the segmentation rule uses a context pattern;
       select, using a selection rule, from the defect population segment, a selected set of defects including at least two defects;
       compute one or more statistics of the signal attributes of the defects in the defect population segment;
       replicate the selected set of defects to yield generated defects;
       shift, using the one or more statistics, the generated defects outside of the defect population segment by increasing the signal attributes by a number of standard deviations;
       create a training set with the selected set of defects and the generated defects, wherein the selected set of defects is labeled as nuisance in the training set and the generated defects are labeled as defects-of-interest in the training set; and
       train, using the training set, a binary classifier for each of the defect population segments, wherein the binary classifier includes a novel defect bin and a real nuisance bin, wherein the novel defect bin and real nuisance bin share a classification boundary, and wherein segregate the classification boundary is configured to segregate the defect segment population into the novel defect bin and the real nuisance bin based on a signal attribute strength of each defect.

12. The system of claim 11, wherein the particles are photons.

13. The system of claim 11, wherein the one or more statistics include a standard deviation or a mean of the signal attributes of the defects in the defect population segment.

14. The system of claim 11, wherein the signal attribute includes energy, magnitude, spot likeness, or multiple die auto-thresholding offset.

15. The system of claim 11, wherein the partition rule includes one of a hot spot, a region identification, or at least one care area.

16. The system of claim 11, wherein the segmentation rule includes forming the defect population segments based on an optical image context using diversity sampling in an optical image context space.

17. The system of claim 11, wherein the segmentation rule includes design-based grouping or pattern grouping.

18. The system of claim 11, wherein the classification boundary is automatically adjusted to minimize a quantity of nuisances in the novel defect bin.

19. The system of claim 18, wherein after the classification boundary is automatically adjusted, the classification boundary is manually adjusted by a user to update the quantity of nuisances in the novel defect bin.

20. A non-transitory computer-readable storage medium, comprising one or more programs for executing the following steps on one or more computing devices:

provide a nuisance bin in a nuisance filter, the nuisance bin including a defect population having a plurality of defects, wherein each defect has a signal attribute;

partition the defect population, using a partition rule, into a defect population partition, wherein the partition rule uses a care area group;

segment the defect population partition, using a segmentation rule, into a defect population segment, wherein the segmentation rule uses a context pattern;

select, using a selection rule, from the defect population segment, a selected set of defects including at least two defects;

compute one or more statistics of the signal attributes of the defects in the defect population segment;

replicate the selected set of defects to yield generated defects;

shift, using the one or more statistics, the generated defects outside of the defect population segment by increasing the signal attributes by a number of standard deviations outside of the defect population segment;

create a training set with the selected set of defects and the generated defects, wherein the selected set of defects is labeled as nuisance and the generated defects are labeled as defects-of-interest; and train, using the training set, a binary classifier for each of the defect population segments, wherein the binary classifier includes a novel defect bin and a real nuisance bin, wherein the novel defect bin and real nuisance bin share a classification boundary, and wherein the classification boundary is configured to segregate the defect segment population into the novel defect bin and the real nuisance bin based on a signal attribute strength of each defect.

* * * * *